United States Patent …

(12) United States Patent
Bauer et al.

(10) Patent No.: US 10,473,155 B2
(45) Date of Patent: Nov. 12, 2019

(54) RELEASE BEARING

(71) Applicant: Schaeffler Technologies AG & Co. KG, Herzogenaurach (DE)

(72) Inventors: Jens Bauer, Schweinfurt (DE); Jens Baumann, Röthlein (DE); Benjamin Kaiser, Zeil am Main (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/085,151

(22) PCT Filed: Feb. 8, 2017

(86) PCT No.: PCT/DE2017/100091
§ 371 (c)(1),
(2) Date: Sep. 14, 2018

(87) PCT Pub. No.: WO2017/157367
PCT Pub. Date: Sep. 21, 2017

(65) Prior Publication Data
US 2019/0107147 A1    Apr. 11, 2019

(30) Foreign Application Priority Data

Mar. 18, 2016   (DE) .................. 10 2016 204 500

(51) Int. Cl.
| | |
|---|---|
| *F16C 19/10* | (2006.01) |
| *F16C 33/76* | (2006.01) |
| *F16C 19/16* | (2006.01) |
| *F16D 23/14* | (2006.01) |
| *F16C 33/78* | (2006.01) |
| *F16J 15/3256* | (2016.01) |

(Continued)

(52) U.S. Cl.
CPC ........ *F16C 19/163* (2013.01); *F16C 33/7846* (2013.01); *F16C 33/7876* (2013.01); *F16D 23/14* (2013.01); *F16J 15/3256* (2013.01); *F16J 15/3268* (2013.01); *F16J 15/4478* (2013.01); *F16C 2326/01* (2013.01); *F16C 2361/43* (2013.01); *F16D 2300/08* (2013.01)

(58) Field of Classification Search
CPC ............... F16C 19/163; F16C 33/7846; F16C 33/7876; F16C 2361/43; F16D 23/14; F16D 23/142; F16D 23/143; F16D 23/144; F16D 23/145; F16D 23/146; F16D 23/147; F16D 23/148; F16J 15/3256; F16J 15/3268; F16J 15/4478
See application file for complete search history.

(56) References Cited

U.S. PATENT DOCUMENTS 7,222,709 B2 * 5/2007 Arnault .................. F16D 23/14
192/110 B
2011/0129175 A1 * 6/2011 Suzuki .................. F16C 19/163
384/480

(Continued)

FOREIGN PATENT DOCUMENTS

DE    102009030209 A1   6/2009
DE    102008039489 A1   2/2010
(Continued)

*Primary Examiner* — Phillip A Johnson
(74) *Attorney, Agent, or Firm* — Kevin L. Parks

(57) ABSTRACT

A release bearing in which a permanently high sealing effect is provided, with at the same time a space saving arrangement of the sealing devices.

10 Claims, 1 Drawing Sheet

(51) Int. Cl.
*F16J 15/3268* (2016.01)
*F16J 15/447* (2006.01)

(56) References Cited

U.S. PATENT DOCUMENTS

| | | | |
|---|---|---|---|
| 2011/0206311 A1* | 8/2011 | Dittmer | F16D 23/14 |
| | | | 384/607 |
| 2015/0377292 A1 | 12/2015 | Benoit et al. | |

FOREIGN PATENT DOCUMENTS

| | | | | |
|---|---|---|---|---|
| DE | 102009049466 A1 | | 4/2011 | |
| DE | 102012208953 A1 | | 12/2013 | |
| EP | 2287486 A1 | | 2/2011 | |
| JP | 2006009932 A | | 1/2006 | |
| JP | 2009144895 A | | 7/2009 | |
| JP | 2011099564 A | * | 5/2011 | ............. F16D 23/14 |
| JP | 2012036990 A | * | 2/2012 | .......... F16C 33/3856 |
| WO | 2009145216 A1 | | 12/2009 | |
| WO | 2016030494 A1 | | 3/2016 | |

* cited by examiner

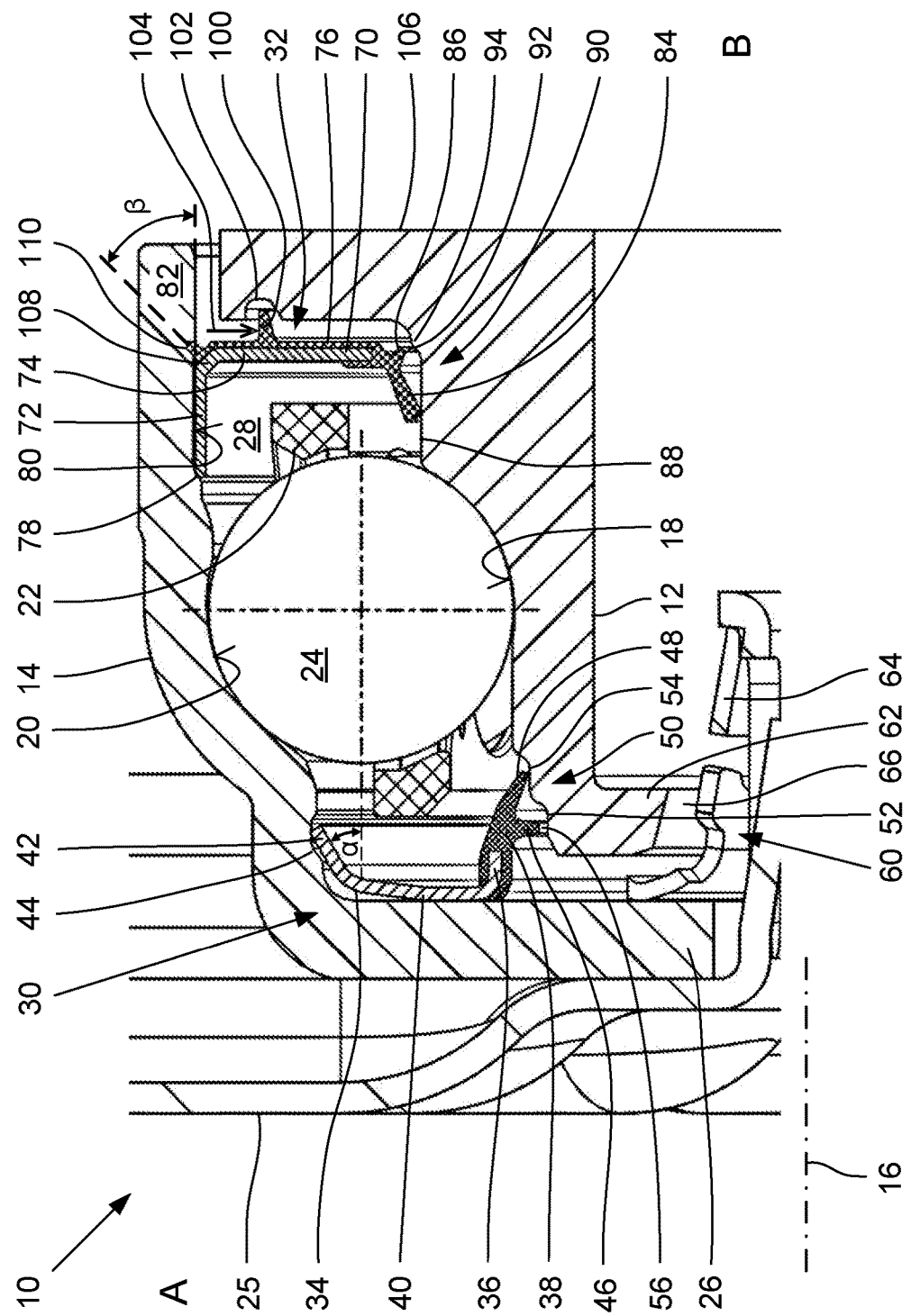

RELEASE BEARING

CROSS REFERENCE TO RELATED APPLICATION

This application is the U.S. National Phase of PCT Appln. No. PCT/DE2017/100091 filed Feb. 2, 2017, which claims priority to DE 102016204500.8 filed Mar. 18, 2016, the entire disclosures of which are incorporated by reference herein.

TECHNICAL FIELD

The present disclosure relates to a release bearing for a friction clutch, having an inner race, an outer race and a plurality of spherical rolling bodies which roll on an inner race bearing track and an outer race bearing track and are guided in a cage, in which release bearing the inner race interacts with a release element for operating the friction clutch and in which the outer race can be brought into contact in a freely rotatable manner with spring tongues of a diaphragm spring of the friction clutch, and in which an engine-side sealing device and a transmission-side sealing device are arranged radially between the inner race and the outer race.

BACKGROUND

In motor vehicles, friction clutches serve for the mechanical disengagement of the transmission from the internal combustion engine when, for example, the transmission ratio of the manual transmission is adapted to the current operating state of the internal combustion engine. For operating such a friction clutch, use is made of release bearings which can be moved axially by means of an actuating device and can be brought into contact with the disks of a clutch diaphragm spring.

A release bearing of a friction clutch which is designed as a diaphragm spring clutch is known from DE 10 2009 049 466 A1. The release bearing comprises inter alia a bearing inner race, a bearing outer race and a plurality of spherical rolling bodies which are arranged annularly between bearing tracks of the two bearing races and are guided in a bearing cage. The bearing inner race can be connected to a release element in a rotation-resistant manner, whereas the bearing outer race is of a freely rotatable design and can be brought into contact with radially inner spring tongues of a diaphragm spring of a friction clutch. The two bearing races delimit a bearing inner space which contains the rolling bodies and is partially filled with a bearing grease, which space is closed off at least axially on one side by a seal which is rigidly fastened on the bearing outer race and which butts against an outer cylindrical sealing surface of the bearing inner race by a sealing edge of a sealing lip. For increasing the sealing effect, the sealing lip is provided with a return structure radially on the inside.

A disadvantage of this release bearing is, inter alia, that the return structure of the sealing lip represents a comparatively delicate structure which is in wear-prone friction contact with the outer cylindrical sealing surface of the bearing race so that its pumping action, by which discharged bearing grease is to be delivered back into the bearing interior, is possibly not sustainably ensured.

SUMMARY

The present disclosure discloses a release bearing in which a permanently high sealing effect is provided, with at the same time a space saving arrangement of the sealing devices.

Accordingly, the present disclosure relates to a release bearing for a friction clutch, having an inner race, an outer race and a plurality of spherical rolling bodies which roll on an inner race bearing track and an outer race bearing track and are guided in a cage, in which release bearing the inner race interacts with a release element for operating the friction clutch, and the outer race can be brought into contact in a freely rotatable manner with spring tongues of a diaphragm spring of the friction clutch, and in which an engine-side sealing device and a transmission-side sealing device are arranged radially between the inner race and the outer race.

It is provided in the case of this release bearing that the engine-side sealing device has at least one sealing element with a reinforcement which engages in an annular groove of the outer face, that the engine-side sealing device has a contact-free gap seal radially on the inside, that this gap seal is formed by a radially inwardly directed annular projection of the inner race and a pretensioned spring, that the transmission-side sealing device has a sealing element with at least one radially oriented sealing lip and with an axial sealing lip, and that the axial sealing lip interacts in a contactless manner with a radially outwardly directed, transmission-side end flange of the inner race.

As a result of the engine-side gap seal and the contactlessly acting transmission-side axial sealing lip, the sealing effect of the engine-side and the transmission-side sealing devices of the release bearing is further optimized so that the release bearing, even under rough operating conditions, is particularly effectively protected against penetration of foreign substances or dirt particles, and therefore a long service life is achieved. Furthermore, the engine-side and the transmission-side sealing devices are designed in a very space saving manner.

According to one example embodiment of this release bearing, it is provided that the outer race has a radially inwardly directed, annular abutment flange, that the radially inwardly directed projection of the inner race extends parallel and axially at a distance from the radially inwardly directed abutment flange of the outer race, and that this projection of the inner race has a cross sectional geometry which corresponds to that of a right angled trapezoid. As a result of this, a reliable operation of the spring tongues of the diaphragm spring and also a high degree of mechanical stability of the outer race are provided. Moreover, as a result of the interaction of the radially inwardly directed abutment flange of the outer race with the pretensioned spring a labyrinth-like first gap seal is formed.

It can furthermore be provided that the reinforcement of the engine-side sealing device has a retaining rib, which extends parallel to the bearing center axis of the release bearing, for the at least one engine-side sealing element, and that the engine-side sealing element, radially on the inside, has a first sealing lip and a second sealing lip which are arranged in a radially staggered manner in relation to each other. As a result of this, a reliable seating of the two sealing lips of the sealing element of the engine-side sealing device in the release bearing is ensured.

According to another example embodiment, it can be provided that the first sealing section of the inner race has two circular steps which are formed on the bearing track side, wherein the first sealing lip of the engine-side sealing element extends at a distance from the first step, creating a radial gap, and in which the second sealing lip of the engine-side sealing element butts against the second step. As a result of combining a contact-free seal with a contact-subjected seal with the aid of two sealing lips which are positioned radially and axially offset in relation to each other, an excellent sealing effect of the engine-side sealing element is provided for avoiding penetration of unwanted foreign particles and to counteract loss of lubricant.

Another example embodiment provides that a center section, which extends perpendicularly to the longitudinal center axis and is radially oriented, is formed on the retaining rib of the reinforcement of the engine-side sealing device, that a locking section, which extends obliquely at an angle α to the longitudinal center axis, projects on the center section of the reinforcement, and that the locking section is accommodated in the annular groove of the outer race, locking into place there. On account of the radially outwardly angled locking section, the engine-side sealing element can be fixed in the outer race in a practically non-detachable manner.

According to a further development of the release bearing, it can be provided that a circular axial groove is formed in the transmission-side end flange of the inner race, in which circular axial groove the axial sealing lip of the transmission-side sealing element is accommodated over at least a part of its axial length. Consequently, an extension of the sealing distance is realized there so that as a consequence thereof a further improvement of the sealing effect of the transmission-side sealing element of the release bearing is provided.

It can furthermore be provided that a reinforcement of the transmission-side sealing element has an axially oriented first leg and a radially inwardly directed second leg, and that the first leg butts against a shoulder of an encompassing recess in the region of the free end of the outer race. As a result of this, a reliable seating of the transmission-side sealing element inside the release bearing is provided.

According to another development, it can be provided that the axial sealing lip of the transmission-side sealing element extends perpendicularly to the radially inwardly directed second leg of the reinforcement of the transmission-side sealing device. As a result of this, a space saving integration of the second gap seal into the release bearing is realized.

According to a further embodiment, it can be provided that the sealing element of the transmission-side sealing device, radially on the inside, has two sealing lips which are arranged in a radially staggered manner in relation to each other, that the first sealing lip butts against a sealing surface, formed radially on the inside, of a second sealing section of the inner race, and that the second sealing lip extends radially at a distance from an encompassing step of the inner race, creating a radial gap, which step is formed axially adjacent to the sealing surface, formed radially on the inside, of the inner race. On account of the two sealing lips which are radially oriented and formed in an axially staggered manner in relation to each other, a high sealing effect of the transmission-side sealing element is ensured.

Finally, according to a further development, it can be provided that the sealing element of the transmission-side sealing device, in a beveled region between the first and the second leg, has a third sealing lip which extends obliquely at an angle β to a longitudinal center axis and which butts against the recess of the free end of the outer race. On account of the third, contacting sealing lip, a further optimization of the sealing effect of the transmission-side sealing element is provided.

BRIEF DESCRIPTION OF THE DRAWINGS

For better understanding of the invention, a drawing of an exemplary embodiment is attached to the description.

FIG. 1 a partial longitudinal section of a release bearing according to the present disclosure is shown.

DETAILED DESCRIPTION

The release bearing 10, which is designed as an annular-contact ball bearing, has an inner race 12 and an outer race 14 which coaxially encompasses this, wherein the inner race 12 and the outer race 14 are designed and arranged rotationally symmetrically to a longitudinal center axis 16. Arranged between the inner race 12 and the outer race 14, guided in a cage 22, are spherical rolling bodies 24 which roll on a bearing track 18 of the inner race 12 and on a bearing track 20 on the outer race 14. The inner race bearing track 18 and outer race bearing track 20, in each case of hollow groove-like design, also enable the absorption of axial loads, as occur during the engagement and disengagement of a friction clutch.

The release bearing 10 is intended for operating a dry friction clutch, which is not shown extensively, the clutch spring of which is designed as a diaphragm spring 25. For operating the clutch, a release element, which is not shown either, acts axially upon the inner race 12 in a known manner so that the entire axial bearing 10 is displaced in the direction toward the diaphragm spring 25. In the process, the outer race 14, which is freely rotatable in relation to the inner race 12, presses axially upon the spring tongues of the diaphragm spring 25 of the friction clutch, as a consequence of which a clutch, which is closed in its non-operated state, is opened. For this purpose, the outer race 14 has a radially inwardly directed, annular abutment flange 26 which serves as an abutment for the spring tongues of the diaphragm spring 25 of the friction clutch.

For hermetically sealing an inner space 28 of the release bearing 10, in which the rolling bodies 24 and the cage 22 are located and which when required are at least partially filled with a lubricant such as a bearing grease or the like, an engine-side sealing device 30 is arranged on the engine side A of the release bearing 10, and on the transmission side B of the release bearing 10 a transmission-side sealing device 32 is arranged radially between the two bearing races 12, 14 respectively.

The engine-side or clutch-side sealing device 30 has an annular reinforcement 34 which has a retaining rib 36 which extends mainly parallel to the longitudinal center axis 16 of the release bearing 10 and on which is fastened an engine-side sealing element 38. Adjoining the retaining rib 36 is a center section 40 of the reinforcement 34 which extends mainly perpendicularly to the longitudinal center axis 16 or to the retaining rib 36. Radially on the outside, the reinforcement 34 has a locking section 42 which extends obliquely at an angle α in relation to the longitudinal center axis 16 and which adjoins the center section 40. For fastening the engine-side sealing device 30 in the release bearing 10, the locking section 42 of the reinforcement 34 engages in an outer annular groove 44, formed radially on the inside, of the outer race 14. The value of the angle α lies within an interval of between 15° and 60° inclusive of the interval limits. It is preferably approximately 45°, however. The free end of the locking section 42 of the reinforcement 34 points in this case in the direction toward the transmission side B of the release bearing 10.

Radially on the inside, the engine-side sealing element 38 has a first sealing lip 46 and a second sealing lip 48 which are arranged or designed in a radially staggered manner in relation to each other and in an axially offset manner in relation to each other. Furthermore, a first step 52 and a second step 54 are formed in the region of a first sealing section 50 of the inner race 12, wherein the first step 52 is arranged further toward the inside than the second step 54. The first sealing lip 46 of the engine-side sealing element 38 extends at a distance from the first step 52, creating a narrow radial gap 56, and therefore functions as a presealing device, whereas the second sealing lip 48 butts against the second step 54 and is in direct contact with this.

For supplementing the sealing effect of the engine-side sealing device 30 further, provision is made in the region of the first sealing section 50 of the inner race 12 for a gap seal 60 which is constructed from a radially inwardly directed projection 62 formed in the region of the first sealing section 50 and also from a pretensioned spring 64. The pretensioned spring 64 is by way of example designed as a catch spring in this case, which enables fastening of the outer race 14 of the release bearing 10 on the diaphragm spring 25 of the friction clutch.

In the depicted exemplary embodiment, the radially inwardly directed projection 62 of the inner race 12 has a cross-sectional geometry which corresponds approximately to that of a right angled trapezoid so that between the projection 62 and an axial section of the pretensioned spring 64, which extends obliquely in relation to the longitudinal center axis 16, an annular passage 66 with an axially approximately constant cross section is formed and functions as a contact-free gap seal 60.

The reinforcement 34 of the engine-side sealing device 30 can for example be produced by corresponding forming of a stamped out sheet metal blank in a manner which is simple and suitable for serial production. The sealing element 38 is preferably formed by an elastomer or by a suitable thermoplastic material and can be connected to the reinforcement 34 for example by pressing on, adhesive fastening or vulcanizing. A sealing element 38 which is formed by a thermoplastic material can also be injected directly onto the reinforcement 34.

The transmission-side sealing device 32 has a reinforcement 70 which is designed in the manner of a circular angle plate with a first leg 72 which extends parallel to the longitudinal center axis 16 and a second leg 74 which adjoins the first leg at right angles. Arranged on the radially oriented second leg 74 is a sealing element 76 of the transmission-side sealing device 32. The first, axial leg 72 of the reinforcement 70 butts against a shoulder 78 of an encompassing recess 80 in the region of a free end 82 of the outer race 14, as a result of which a reliable positional fixing of the transmission-side sealing device 32 in the outer race 14 is ensured. The transmission-side sealing element 76 is arranged axially on the outside and is fixedly connected to the reinforcement 70 of the second sealing device 32.

The transmission-side sealing element 76 has, inter alia, a first sealing lip 84 and a second sealing lip 86. These two sealing lips 84, 86 are radially staggered in relation to each other and designed or arranged in an axially offset manner in relation to each other, wherein the first sealing lip 84 butts against a radially inner and cylindrical sealing surface 88 of a second sealing section 90 of the inner race 12, and wherein the second sealing lip 86, as a pre-seal, extends at a distance from a radially outwardly pointing step 94 of the sealing surface 88, keeping free a narrow radial gap 92.

For further optimization of the sealing effect of the transmission-side sealing device 32, this, radially on the outside, has an axial sealing lip 100 which is formed on the sealing element 76 and extends parallel to the longitudinal center axis 16, which axial sealing lip partially sinks into an encompassing axial groove 102 of the inner race 12, but without making direct mechanical contact with this. In this exemplary embodiment, the axial sealing lip 100 has a cross-sectional geometry which corresponds to that of a right angled trapezoid in order to ensure a higher degree of flexural rigidity radially inward or in the direction of the arrow 104.

The axial groove 102 is formed in an end flange 106 of the inner race 12, which end flange extends in a radially outwardly directed manner or perpendicularly to the longitudinal center axis 16. For simplifying the production process of the release bearing 10, this axial groove 102 can in some circumstances be dispensed with, accepting a shortening of the sealing path, as a result of which the axial sealing lip 100 extends slightly axially at a distance, or creating a narrow gap, from the flat end flange 106 of the inner race 12 in this configuration (not shown).

Furthermore, a third sealing lip 110 is formed on the transmission-side sealing element 76 in a basically straight beveled region 108 between the axial leg 72 and the radial leg 74 of the sealing element 76, which third sealing lip extends obliquely at an angle $\beta$ to the longitudinal center axis 16 and on the inside butts against the inner cylindrical recess 80 of the outer race 14. This rib-like third sealing lip 110 is inclined in this case in the direction toward the transmission side B of the release bearing 10. A value of the angle $\beta$ lies with an interval of between 15° and 60°, inclusive of the interval limits, but it is preferably approximately 45°, however.

With regard to the material structure of the transmission-side sealing device 32 and also to the production processes which are suitable for its production, reference may be made at this point to the applicable description part further above, especially in order to avoid repeats in relation to content.

LIST OF DESIGNATIONS

10 Release bearing
12 Inner race
14 Outer race
16 Longitudinal center axis
18 Inner race bearing track
20 Outer race bearing track
22 Cage
24 Rolling bodies
25 Diaphragm spring
26 Abutment flange on the outer race
28 Inner space
30 Engine-side sealing device
32 Transmission-side sealing device
34 Reinforcement on the engine-side sealing device
36 Retaining rib of the reinforcement 34
38 Sealing element on the engine-side sealing device
40 Center section of the reinforcement 34
42 Locking section of the reinforcement 34
44 Annular groove on the radial inner side of the outer race
46 First sealing lip of the engine-side sealing device
48 Second sealing lip of the engine-side sealing device
50 First sealing section on the inner race
52 First step on the inner race
54 Second step on the inner race
56 Radial gap
60 Gap seal
62 Projection on the inner race
64 Pretensioned spring
66 Passage
70 Reinforcement on the transmission-side sealing device
72 First leg of the sealing element 76

74 Second leg of the sealing element 76
76 Sealing element of the transmission-side sealing device
78 Shoulder on the outer race
80 Recess on the outer race
82 Free end of the outer race
84 First sealing lip of the sealing element 76
86 Second sealing lip of the sealing element 76
88 Cylindrical sealing surface on the second sealing section
90 Second sealing section on the inner race
92 Radial gap
94 Step on the inner race
100 Axial sealing lip of the sealing element 76
102 Axial groove
104 Arrow
106 Transmission-side end flange on the inner race
108 Beveled region of the sealing element 76
110 Third sealing lip of the sealing element 76
A Engine side
B Transmission side
α Angle
β Angle

The invention claimed is:

1. A release bearing for a friction clutch, comprising:
an inner race;
an outer race;
spherical rolling bodies which roll on an inner race bearing track and an outer race bearing track and are guided in a cage;
wherein the inner race interacts with a release element for operating the friction clutch and the outer race is brought into contact in a freely rotatable manner with spring tongues of a diaphragm spring of the friction clutch; and
an engine-side sealing device and a transmission-side sealing device are arranged radially between the inner race and the outer race, the engine-side sealing device has at least one sealing element with a reinforcement that engages in an annular groove of the outer race, and has a contact-free gap seal radially on the inside, the gap seal formed by a radially inwardly directed annular projection of the inner race and a pretensioned spring;
wherein the transmission-side sealing device has a sealing element with at least A one radially oriented sealing lip and an axial sealing lip that interacts in a contactless manner with a radially outwardly directed, transmission-side end flange of the inner race.

2. The release bearing of claim 1, wherein the outer race has a radially inwardly directed, annular abutment flange,
the radially inwardly directed projection of the inner race extends parallel and axially at a distance from the radially inwardly directed abutment flange of the outer race; and,
the inwardly directed projection of the inner race has a cross-sectional geometry that corresponds to that of a right angled trapezoid.

3. The release bearing of claim 1, wherein the reinforcement of the engine-side sealing device has a retaining rib that extends parallel to the bearing center axis of the release bearing, for the at least one engine-side sealing element; and
the engine-side sealing element radially on the inside, has a first sealing lip and a second sealing lip which are arranged in a radially staggered manner in relation to each other.

4. The release bearing of claim 3, wherein the first sealing section of the inner race has two circular steps formed on the bearing track side, and the first sealing lip of the engine-side sealing element extends at a distance from the first step creating a radial gap and the second sealing lip of the engine-side sealing element butts against the second step.

5. The release bearing of claim 3, further comprising a center section which extends perpendicularly to the longitudinal center axis and is radially oriented, formed on the retaining rib of the reinforcement of the engine-side sealing device including a locking section that extends at tan oblique angle (α) to the longitudinal center axis, projects on the center section of the reinforcement, and the locking section is accommodated in the annular groove of the outer race locking into place there.

6. The release bearing of claim 1, wherein a circular axial groove is formed in the transmission-side end flange of the inner race, in which the axial sealing lip of the transmission-side sealing device is accommodated over a part of the axial length the of the axial groove.

7. The release bearing of claim 1, wherein a reinforcement of the transmission-side sealing device has an axially oriented first leg and a radially inwardly directed second leg and the first leg butts against a shoulder of an encompassing recess in the region of the free end of the outer race.

8. The release bearing of claim 7, wherein the axial sealing lip of the transmission-side sealing device extends perpendicularly to the radially inwardly directed second leg of the reinforcement of the transmission-side sealing device.

9. The release bearing of claim 1, wherein the sealing element of the transmission-side sealing device radially on the inside, has sealing lips that are radially staggered in relation to each other, and the first sealing lip butts against a sealing surface formed radially on the inside of a second sealing section of the inner race and the second sealing lip extends radially at a distance from an encompassing step of the inner race creating a radial gap in which a step is formed axially adjacent to the sealing surface, formed radially on the inside, of the inner race.

10. The release bearing of claim 1, wherein the sealing element of the transmission-side sealing device in a beveled region between the first and the second leg has a third sealing lip that extends at an oblique angle (β) to a longitudinal center axis and that abuts against the recess of the free end of the outer race.

* * * * *